United States Patent [19]

Ma

[11] Patent Number: 6,085,712
[45] Date of Patent: *Jul. 11, 2000

[54] STRATIFIED CHARGE ENGINE

[75] Inventor: Thomas Tsoi-Hei Ma, Essex, United Kingdom

[73] Assignee: Ford Global Technologies, Inc., Dearborn, Mich.

[ * ] Notice: This patent is subject to a terminal disclaimer.

[21] Appl. No.: 09/051,182

[22] PCT Filed: Jul. 5, 1996

[86] PCT No.: PCT/GB96/60160

§ 371 Date: May 26, 1998

§ 102(e) Date: May 26, 1998

[87] PCT Pub. No.: WO97/13967

PCT Pub. Date: Apr. 17, 1997

[30] Foreign Application Priority Data

Oct. 6, 1995 [GB] United Kingdom ............... 9520427

[51] Int. Cl.[7] .................................... F02M 35/10
[52] U.S. Cl. ................. 123/184.42; 123/184.45; 123/568.19
[58] Field of Search ............... 123/568.19, 442, 123/336, 184.42, 184.45

[56] References Cited

U.S. PATENT DOCUMENTS

| 4,856,473 | 8/1989 | Kawai et al. | 123/308 |
| 4,924,840 | 5/1990 | Wade | 123/571 |
| 5,653,202 | 8/1997 | Ma | 123/184.42 |

*Primary Examiner*—John Kwon
*Attorney, Agent, or Firm*—Jerome R. Drouillard

[57] ABSTRACT

An internal combustion engine is described comprising a cylinder having an intake port [14], and two manifolds [24, 34] having branches [22, 32] that are configured to supply two gas streams to the intake port [14] of each cylinder. The two streams enter the cylinder separately so as to produce a stratified charge within the engine cylinder. The first manifold [24] supplies a metered quantity of air within which the fuel to be burnt is dispersed and the second manifold [34] supplies dilution gases. A flow obstructing throttle [23] is arranged in each branch [22] of the first manifold to reduce the risk of back-filling of the branches [22] of the first manifold [24].

21 Claims, 1 Drawing Sheet

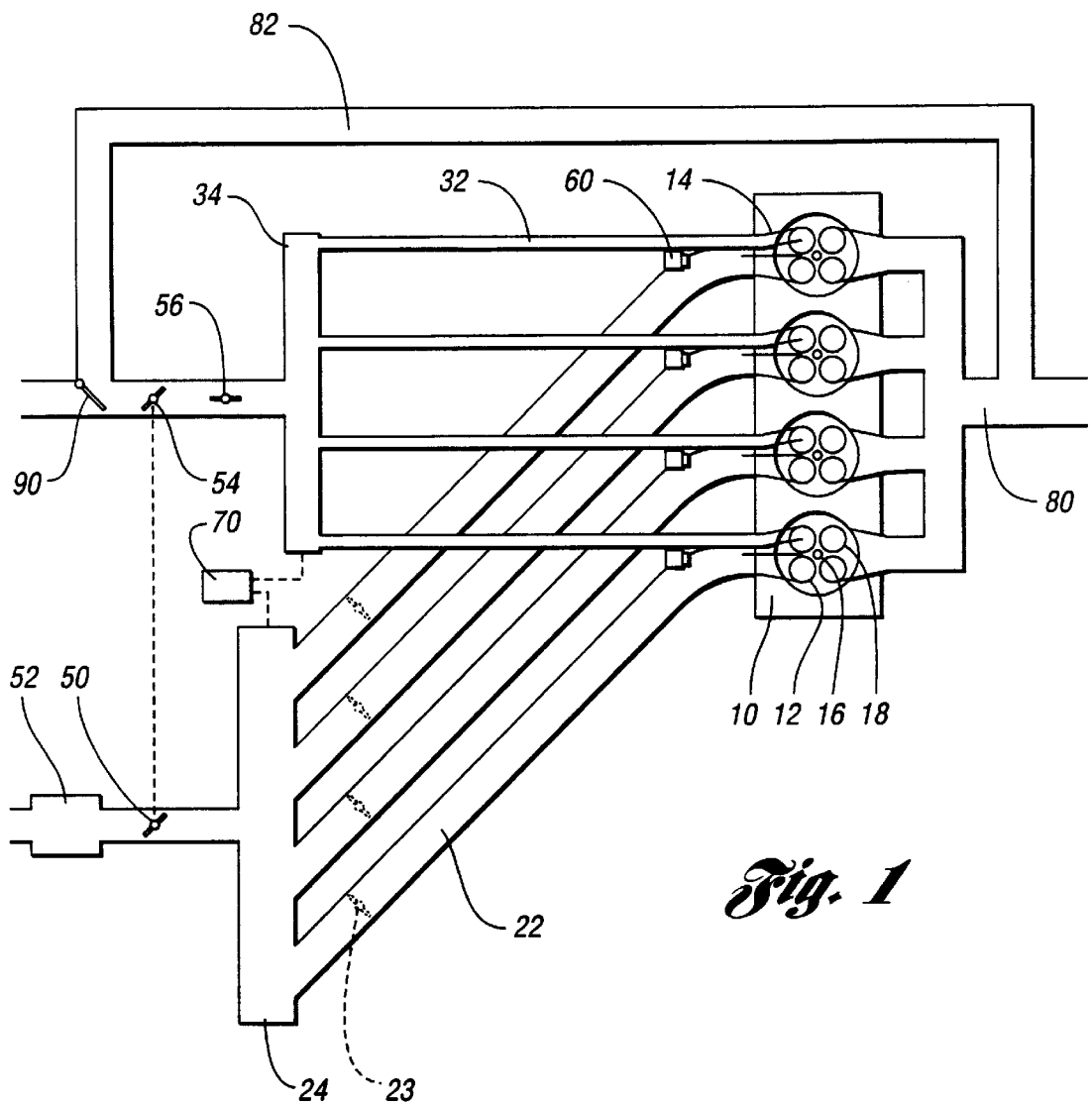
*Fig. 1*
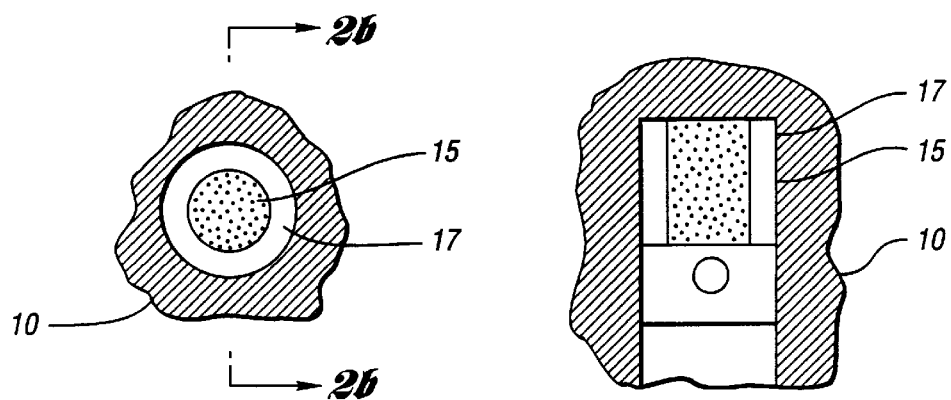
*Fig. 2a*  *Fig. 2b*

STRATIFIED CHARGE ENGINE

FIELD OF THE INVENTION

The present invention relates to a stratified charge internal combustion engine fitted with two intake manifolds having branches that are configured to supply two gas streams to an intake port of each engine cylinder, the two streams entering each cylinder separately so as to produce a stratified charge within the cylinder, the first manifold supplying a metered quantity of air within which the fuel to be burnt is dispersed and the second manifold supplying dilution gases. Such an engine will hereinafter be referred to as "an engine of the type described initially".

BACKGROUND OF THE INVENTION

Engines are known that comprise two manifolds having branches that are configured to supply two gas streams to an intake port of each cylinder, the first manifold supplying a metered quantity of air within which the fuel to be burnt is dispersed and the second manifold supplying recirculated exhaust gases (EGR), the EGR gases serving as dilution gases.

Conventional engines do not achieve charge stratification because the two streams are well mixed on entering the cylinder. The EGR gases supplied through the second manifold during periods that the intake valve is closed, continue to enter and are stored in the intake port and in the branch of the first manifold. When the intake valve opens again, the intake charge first inducted into the cylinder comprises EGR gases that contain little oxygen yet have a high fuel content picked up from the walls of the wet intake port. This can be tolerated only if the combustion chamber is designed to produce good mixing of the charge during the compression stroke, as is the case in conventional engines. However, in a stratified charge engine, this storage of EGR gases in the branches of the first manifold must be avoided as such stratification would result in poor combustion quality.

In an engine of the type described initially, it is important to control the velocities of the two streams entering the combustion chamber such that there is minimum mixing between them during the intake and compression strokes in order to conserve the stratification up to the time of ignition. It is for this reason that in the case of swirling fluid motion in the combustion chamber, the linear velocity of the outer stream in the vortex should be faster than the linear velocity of the inner stream in the vortex such that their angular velocities are substantially equal in order to ensure minimum mixing.

In order to produce these velocities, a greater pressure difference must be applied along the branch of the faster stream than along the branch of the slower stream. Since the vacuum pressure in the intake port is common to both the branches, the vacuum pressure in the plenum chambers of the two manifolds upstream of the respective branches must be set unequally in order to provide the necessary pressure differences accordingly.

During the intake stroke of one of the cylinders, the suction in the associated intake branch would set up unequal pressures in the two plenum chambers causing balancing flows along the branches of the other cylinders not undergoing suction in the direction to equalise the pressures. These balancing flows are undesirable as the content of one stream would be replaced by the content of the other stream and the distinction in content between parallel streams would be lost.

WO96/10688 discloses an engine as described initially, wherein a non-return valve is arranged in each branch of the first manifold to permit gas flow in the branch only in the direction towards the intake valve. This achieves the required objective of maintaining the two streams separate at all times before they reach the combustion chamber but has the disadvantage that the non-return valves interfere with the aspiration of the engine under full load operation and reduce the maximum engine power output. To mitigate this effect, the non-return valves must be made as large as possible and this in turn leads to problems of high cost and difficulty in packaging.

SUMMARY OF THE INVENTION

With a view to mitigating the foregoing disadvantages, the present invention provides in accordance with a first aspect a method of operating an internal combustion engine fitted with two intake manifolds (24,34) having branches (22,32) that are configured to supply two gas streams to an intake port (14) of each engine cylinder, the two streams entering each cylinder separately but in parallel with one another so as to swirl about a common axis in the combustion chamber and thereby produce a charge that is stratified radially from the axis of swirl, the method comprising the steps of:

supplying by way of the first manifold a first stream of air within which the fuel to be burnt is dispersed, supplying by way of the second manifold a second stream of dilution gases, and maintaining the volume flow ratio and the velocity ratio between the two streams at the intake port at substantially constant non-zero values over a wide range of engine speed and load operating conditions, by
1. maintaining the plenum chambers of the two manifolds at the same load dependent pressure,
2. partially obstructing each branch of the first manifold when operating within said range of engine operating conditions in order to set the desired volume flow ratio between the two streams, the branches being obstructed by means of restrictions of predetermined flow cross sectional area, and positioning each restriction (23) at a sufficient distance from its associated intake port (14) to allow a high velocity jet induced at the restriction to diffuse over the cross sectional area of the first manifold branch before the stream reaches the intake port (14), thereby rendering the flow in the branch more uniform and reducing its velocity so as to set the desired velocity ratio between the two streams at the intake port when operating within said range of engine operating conditions.

According to a second aspect of the invention, there is provided a stratified charge internal combustion engine fitted with two intake manifolds having branches that are configured to supply two gas streams to an intake port of each engine cylinder, the two streams entering each cylinder separately but in parallel with one another so as to swirl about a common axis in the combustion chamber and thereby produce a charge that is stratified radially from the axis of swirl, the first manifold supplying a metered quantity of air within which the fuel to be burnt is dispersed and the second manifold supplying dilution gases, wherein means are arranged along the branches of the first manifold for partially obstructing the flow at times when the engine is operating with a stratified charge so as to introduce an additional pressure drop along the branches of the first manifold in order to render the total resistance to gas flow along the branches of the first manifold substantially equal to the total resistance to gas flow along the branches of the second manifold, the flow obstructing means being positioned at a sufficient distance upstream of the intake port for the increased velocity at the flow obstructing means to be dissipated before reaching the intake port.

The flow obstructing means in the branch supplying the slower stream should have an obstruction ratio such that for a given volume flow ratio between the two streams supplied by the plenum chamber of the two manifolds, the increased velocity at the flow obstructing means is substantially equal to the maximum velocity at any point along the other branch supplying the faster stream, thus balancing the pressures at the two manifolds.

As in WO96/10688, the air/fuel mixture and the dilution gases in the present invention are drawn in separately into the engine cylinders, passing over different regions of the intake port and steps are taken to maintain the two streams of the intake charge separate within the combustion chamber during the intake and compression strokes of the engine.

However, flow obstructing means in the branches of the first intake manifold are used in place of non-return valves to prevent back-filling of these branches with dilution gases. When using non-return valves, the pressures in the two plenum chambers of the two manifolds may differ from one another and back-filling of the branches of the first manifold is prevented by the non-return valves. By contrast, in the present invention, the flow resistance along the branches of the first and second manifolds are balanced in order to render the pressures in the plenum chambers of the two manifolds substantially equal to one another. The absence of a pressure difference between the ends the manifold branches that lead to cylinders with closed intake valves eliminates the risk of back-filling of these branches without having to resort to expensive and bulky non-return valves.

The partial obstruction of the branches of the first manifold is required only under low and part load operating conditions, when a stratified charge gives advantages of reduced emission of pollutants and reduced fuel consumption. Under high load, it is preferable to revert to a homogeneous charge, whereupon the flow obstruction may be removed so that it should not interfere with the aspiration of the engine through the first manifold.

It is therefore desirable to provide a two-position flow obstructing throttle in which the closed position affords a preset degree of obstruction for stratified charge operation and the open position affords a minimum of obstruction for homogeneous charge operation. Such a two-position throttle may conveniently be formed as a butterfly throttle in which the throttle plate is provided with one or more flow apertures.

Instead of placing individual flow obstructing throttles along the length of the branches of the first manifold, it is possible to obstruct the mouth of the branches at their junction to the common plenum chamber of the first manifold. In this case, a single movable baffle may be used to obstruct all the branches allowing a simplification of the construction and ensuring correctly balanced flow to the different engine cylinders.

At the flow obstructing throttle the local velocity in the branches of the first manifold is intentionally increased to be substantially equal to the flow velocity in the branches of the second manifold at their intake port ends. However, it is important that the flow velocity in the branches of the first manifold at their intake port ends should return to a lower value and this can be achieved by positioning the flow obstructing throttle in the branches of the first manifold sufficiently far upstream of the intake ports to allow the increased velocity to be dissipated before the charge reaches the intake port.

If the flow obstructing throttle is formed by a single aperture, then the dissipation of the gas velocity will take place over a considerable length of the manifold branches. For this reason, it is preferred to form the flow obstructing throttle as a plurality of small apertures, for example by forming the plate of a butterfly valve as a wire mesh or grid. In this case the mean velocity of the gases will rapidly return to their value upstream of the flow obstructing throttle, thereby permitting the latter throttle to be positioned relatively close to the intake ports.

An engine having the aim of stratifying the charge and having generally the same components as the present invention except for the obstructing means in the branches of the first intake manifold has been proposed in WO95/22687. In the latter patent specification, the first manifold is especially designed to act as a reservoir for gases supplied through the second manifold while the intake valve is closed so that along the length of the branches of the first manifold there is stored a column of dilution gases that is stratified along its length and which, if drawn into the cylinder without being disturbed, gives rise to an axially stratified charge within the engine cylinder.

One of the described embodiments of the latter application ensures thorough scavenging of the closed end of the intake port during the period when the intake valve is closed, that it to say, it makes sure that the intake port is left clean of fuel-air mixture. The reverse flow of dilution gases is then exploited to store within the branch of the first intake manifold a stratified charge which is subsequently drawn into the engine cylinder during the intake stroke, still as a column, to create axial stratification within the cylinder. The thorough scavenging ensures that no isolated pocket of fuel-air mixture is drawn into the cylinder separate from the main mixture charge.

The above application also describes an embodiment which, during the period when the intake stroke is taking place, takes advantage of the parallel flows of fuel-air mixture from the first intake duct and dilution gases from the second intake duct to create transverse stratification across the engine cylinder. The combined effect in both embodiments is one of predominately axial charge stratification along the cylinder, with stratification across the cylinder existing only as a minor feature.

A requirement of the above system is that the length of the intake ducts must be sufficient to store the column of stratified charge. Also in the case where the second intake flow of dilution gases consists of EGR gases, because of the reverse flow into the first intake ducts, the intake port and the first intake duct will alternately contain fuel-air mixture and EGR gases and it is necessary to make sure there is no liquid fuel wetting the walls of the intake port otherwise this wet fuel will be entrained by the EGR gases which contains no oxygen and cannot support combustion. This restricts the application of stratified EGR to pre-mixed fuel-air mixture which is already finely atomised or fully vaporised before it is supplied to the first intake duct which should remain dry. This precludes the use of intake port fuel injection which typically deposits wet fuel on the intake port walls.

The present invention does not rely on thorough scavenging of the closed end of the intake port during the period when the intake valve is closed, but avoids the reverse flow of dilution gases into the branches of the first intake manifold. The branch is not now filled from its end nearer to the intake valve and does not store a column of stratified charge. Instead it remains filled with fuel-air mixture which is drawn into the cylinder as soon as the intake valve is open. This achieves stratification in the combustion chamber by parallel flows and allows more freedom in the choice of the length of the intake ducts and the quality of the fuelling system where wall wetting is permissible.

The branches of the second manifold leading to the intake port are preferably of a substantial diameter as compared with the branches of the first manifold, being typically between a quarter and a half of the full flow cross section of the intake port. It may be considered that the presence of such large branches of the second manifold in the intake ports might restrict the breathing of the engine and reduce its full load capacity when the dilution gas supply to the second manifold is shut off. However, because flow can occur in both directions along the branches of the second manifold, under conditions when the pressures in the two manifolds are unequal, the second manifold will act to store gases drawn through the branches of the first manifold while the intake valves are closed and to transfer gases between branches of the first intake manifold. As a result, when the supply of dilution gases to the second manifold is shut off, both manifolds will be supplying combustible mixture to the intake valves.

The dilution gases may either be air, EGR gases or a mixture of the two. In the case of stratification with EGR gases alone, by metering the air supplied only to the first manifold and setting the fuel quantity accordingly, it is possible to ensure that the mixture strength within the combustible part of the charge is stoichiometric, thereby permitting the use of a three-way catalyst to purify the exhaust gases.

BRIEF DESCRIPTION OF THE DRAWINGS

The invention will now be described further, by way of example, with reference to the accompanying drawings, in which:

FIG. 1 is a schematic diagram of a four cylinder spark ignition internal combustion engine fitted with an intake and exhaust manifold system designed to produce a radially stratified charge, and FIG. 2 schematically shows horizontal and vertical sections through a combustion chamber to show the distribution of fuel and air mixture and dilution gases within the combustion chamber produced by the intake system of FIG. 1.

DETAILED DESCRIPTION OF THE PREFERRED EMBODIMENTS

In FIG. 1 an engine 10 has combustion chambers each with two intake valves 12 and two intake ports 14, a spark plug 16 and two exhaust valves 18. Both of the intake ports 14 are supplied with air from a first manifold that has a plenum chamber 24 and separate branches 22 leading to the individual cylinders. The plenum chamber 24 draws in outside air through a flow meter 52 and a supply throttle 50. Fuel is introduced into the first manifold near the intake ports by fuel injectors 60, the fuel quantity being calculated in dependence upon the air flow drawn in through the first manifold only.

A second manifold having a plenum chamber 34 and separate branches 32 leading to the intake ports 14 of the cylinders is provided to supply dilution gases under certain operating conditions. To this end the plenum chamber 34 is connected to the exhaust manifold 80 through an EGR pipe 82 and a supply throttle 54 can be used to regulate the flow of EGR gases drawn into the engine. The illustrated embodiment also permits the second manifold 34 to be connected to outside air through a diverter valve 90. This valve 90 enables different compositions of the dilution gases to be used, ranging from 100% EGR to 100% air, or any desired EGR/air ratio between these two extremes.

As so far described, the engine is generally similar to that described in WO96/10688. In the present invention however flow obstructing throttles 23 are provided in the branches 22 to avoid back-filling of these branches with dilution gases. These flow obstructing throttles 23 introduce an additional pressure drop along the length of the branches 22 of the first manifold so as the make the pressure drop over the entire length of these branches substantially equal to the pressure drop across the length of the branches 32 of the second manifold. In other words, the total flow resistance of the branches 22 supplying the slower stream is increased by the addition of the flow obstructing throttles 23 to match the flow resistance along the branches 32 supplying the faster stream.

The branches 32 of the second manifold at the intake port 14 are directed tangentially so that as dilution gases enter the combustion chambers, they are directed at a relatively high velocity towards the outer circumference of the cylinder. The branches 22 of the first manifold at the intake port 14, on the other hand, are directed towards the centre of the cylinder and supply an air and fuel mixture at a lower velocity. The strong swirl created by the direction and relative velocity of the two streams produces the charge distribution shown in FIG. 2 in which the shaded region 15 represents the combustible mixture and the unshaded region 17 represents the dilution gases. Because of the difference in velocities of the two streams, the combined streams tend to rotate within the combustion chamber as a solid body to maintain the stratification throughout the induction and compression strokes.

The cylindrical shape of the combustible mixture 15 in FIG. 2 assumes that the two intake valves 12 are opened at the same time and have equal lift. By modifying the valve event of one of the valves relative to the other, it is possible to vary the relative sizes of the valve openings at different times during the intake period. For example, the combustible mixture 15 may enter through a narrower opening at the start of the intake stroke with the result that the relative proportion of dilution gases will gradually decrease as the intake stroke progresses resulting in a downwardly facing truncated cone containing the combustible mixture instead of a regular cylinder. This has the advantage that for a given total fuel quantity, more of the available fuel will be concentrated at the top of the cylinder near the spark plug at the instant of ignition to produce a more robust combustion.

In order to achieve a constant degree of charge stratification over a range of engine operating conditions, it is necessary to maintain the volume of the flows supplied by the first and the second manifolds at a substantially fixed ratio with one another. This can be achieved by correctly sizing the supply throttles 50 and 54 to achieve the desired volume flow ratio and ganging the two throttles for simultaneous movement so as to maintain this ratio constant over a range of throttle positions. In the invention, a fixed obstruction ratio for the flow obstructing throttle 23 is also selected to match the fixed volume flow ratio in the two streams in order to maintain equal pressures in the two plenum chambers 24, 34 over the stratified charge operating range.

For example in FIG. 1, the effective flow cross sections of the two streams at the intake port 14 are in the ratio of 1:3. If a 3:1 velocity ratio is required between the streams to maintain good stratification, then the supply throttles 54, 50 must be sized in the ratio of 1:1 in order to supply a 3:1 velocity ratio at the intake port 14. The flow obstructing throttles 23 must be set such that the increased velocity at the throttles 23 is equal to the maximum velocity in the branch 32 at the intake port 14 thus incurring the same pressure drop in the branch 22 as in the branch 32. Because the flow obstructing throttles 23 are positioned in the branch 22 sufficiently upstream of the intake port 14, the increased velocity will be dissipated before reaching the intake port 14 so that the exit velocity ratio of the two streams at the intake port 14 remains at 3:1 while the pressures in the two plenum chamber are now balanced.

It should be appreciated from the above example that the volume flow ratio through the supply throttles 54, 50, the exit velocity ratio in the intake port 14 and the obstruction ratio of the flow obstructing throttles 23 are inter-dependent and must be optimised in relation with one another. Thus it is possible to operate the engine at the same degree of charge stratification over a wide range of engine load and speed conditions provided that these ratios are kept constant by suitable design of each system.

It should be mentioned that long branches 22 are shown in FIG. 1 for clarity. These branches need only be long enough to allow the gases to recover their entry velocity after leaving the flow obstructing throttles 23. If the throttles 23 are formed as a mesh or grid with many small holes, then this recovery occurs in a short distance and the flow obstructing throttles 23 can be positioned close to the intake ports 14.

In FIG. 1, a shut-off valve 56 is positioned in series with the supply throttle 54 and downstream of the same. When this shut-off valve 56 is open, then the engine operates with a stratified charge. For homogeneous charge operation, for example at high engine load, the shut-off valve 56 is closed in order to isolate the plenum 34 both from the ambient and from the EGR pipe 82. Under this condition, there will be a large pressure difference between the plenums 24 and 34 causing a large balancing flow along the branches 22 and 32. The second manifold will act to store air and fuel mixture and to transfer the mixture between cylinders so that the cylinders will receive a combustible mixture from both manifolds, albeit that some of the mixture will reach each cylinder indirectly. In this position, the flow obstructing throttles 23 could be allowed to stay in their obstructing position but this would reduce the breathing of the engine and it is desirable for full load operation to open the flow obstructing throttles 23 fully. The throttles 23 can therefore be ganged for operation with the shut-off valve 56 so that the former is open when the engine is run with a homogeneous mixture and is closed when the engine is operated with a stratified charge.

Alternatively, the flow obstructing throttles 23 could be coupled to the supply throttle 50 to open only as the supply throttle 50 is moved near to the wide open position. To this end the coupling between the throttles 50 and 23 should include lost motion so that the flow obstructing throttles 23 remain in their obstructing position until full load operation is approached.

For initial calibration of the obstruction ratio of the flow obstructing throttles 23, it is possible to use a differential pressure gauge 70 connected between the two plenum chambers 24 and 34 and to adjust the obstruction ratio until a zero differential pressure is achieved. Once the desired obstruction ratio has been determined, it should not require varying or fine tuning as long as the volume flow ratio through the supply throttles 54, 50 remains the same as during calibration. In practice, errors in the ganging of the supply throttles 50 and 54 and in the partitioned areas of the two streams at the intake port 14 can cause variation from one engine to another and this can be corrected by resorting to a closed loop control system that fine tunes the relative flows of the two supply streams or varies the obstruction ratio of the flow obstructing throttles 23 to achieve a pressure balance between the two plenum chambers 24 and 34.

The illustrated embodiment has multi-point fuel injection. However as the invention does not critically depend on a dry intake manifold, it is alternatively possible to use a carburettor or a central fuel injection system supplying fuel directly into the plenum 24.

I claim:

1. A stratified charge internal combustion engine fitted with a first and second intake manifold having branches that are configured to supply two gas streams to an intake port of each engine cylinder, the two streams entering each cylinder separately but in parallel with one another so as to swirl about a common axis in the combustion chamber and thereby produce a charge that is stratified radially from the axis of swirl, the first manifold supplying a metered quantity of air within which the fuel to be burnt is dispersed and the second manifold supplying dilution gases, wherein means are arranged along the branches of the first manifold for partially obstructing the flow at times when the engine is operating with a stratified charge so as to introduce an additional pressure drop along the branches of the first manifold in order to render the total resistance to gas flow along the branches of the first manifold substantially equal to the total resistance to gas flow along the branches of the second manifold, the flow obstructing means being positioned at a distance upstream of the intake port for the increased velocity at the flow obstructing means to be dissipated before reaching the intake port.

2. An internal combustion engine as claimed in claim 1, wherein the branches of the second manifold at the intake port have a flow cross sectional area equal to at least one quarter of the total area of the intake port of the engine cylinder.

3. An internal combustion engine as claimed in claim 2, wherein the branches of the first and second intake manifolds at the intake port have approximately equal flow cross sections.

4. An internal combustion engine as claimed in claim 3, wherein the streams of gases from the branches of the first and second manifolds at the intake port are maintained separate by a physical partition in the intake port until they reach the vicinity of the intake valves.

5. An internal combustion engine as claimed in claim 4, wherein the branches of the first and second manifolds at the intake port are designed to give substantially parallel flows travelling with different velocities directed tangentially to the cylinder bore of the combustion chamber so as to produce swirling motion in the combustion chamber about the axis of the cylinder.

6. An internal combustion engine as claimed in claim 5, wherein fuel is metered in dependence upon the air quantity drawn in through the first intake manifold.

7. An internal combustion engine as claimed in claim 6, wherein fuel is metered as a spray into a plenum chamber of the first manifold to mix with the metered air supply.

8. An internal combustion engine as claimed in claim 6, wherein fuel is separately metered as a spray into each branch of the first intake manifold downstream of the associated flow obstructing means.

9. An internal combustion engine as claimed in claim 7, wherein the gases drawn in from the second intake manifold comprise EGR gases.

10. An internal combustion engine as claimed in claim 9, wherein the average fuel-air ratio of the stratified intake charge is stoichiometric.

11. An internal combustion engine as claimed in claim 7, wherein the gases drawn in from the second intake manifold contain air.

12. An internal combustion engine as claimed in claim 11, wherein respective supply throttles are provided for regulating the gas supplies into the first and second manifolds, the supply throttles being ganged for movement in unison.

13. An internal combustion engine as claimed in claim 12, wherein a diverter valve is located upstream of the supply throttle leading to the second manifold, the diverter valve supplying air to the second manifold in a first position, and supplying EGR gases to the second manifold in a second position.

14. An internal combustion engine as claimed in claim 13, wherein a shut-off valve is positioned in series with the supply throttle leading to the second manifold serving when closed to isolate the second manifold from ambient air and EGR gases.

15. An internal combustion engine as claimed in claim 14, wherein the flow obstructing means comprise a butterfly throttle having a perforated plate to provide a predetermined obstruction to the gas flow in its closed position and movable to an open position in which the gas flow is substantially unobstructed.

16. An internal combustion engine as claimed in claim 14, wherein the flow obstructing means comprise a baffle movably mounted in plenum chamber of the first manifold at the mouth of the branches of the first manifold.

17. An internal combustion engine as claimed in claim 15, wherein the butterfly throttle or baffle is coupled for movement with the supply throttles.

18. An internal combustion engine as claimed in claim 15, wherein the butterfly throttle or baffle is coupled for movement with the shut-off valve.

19. An internal combustion engine as claimed in claim 18, wherein over a range of engine load and speed conditions in which the engine is operated with a stratified charge, the volume of the flows supplied by the first and the second manifolds are held in a substantially fixed ratio to one another and the flow obstructing means have a fixed obstruction ratio.

20. An internal combustion engine as claimed in claim 19, wherein each cylinder has two intake valves having different opening events such that the instantaneous ratio of the flow rates of the two streams delivered to the cylinder varies at different times during the intake period.

21. A method of operating an internal combustion engine fitted with two intake manifolds having branches that are configured to supply two gas streams to an intake port of each engine cylinder, the two streams entering each cylinder separately but in parallel with one another so as to swirl about a common axis in the combustion chamber and thereby produce a charge that is stratified radially from the axis of swirl, the method comprising the steps of:

supplying by way of the first manifold a first stream of air within which the fuel to be burnt is dispersed, supplying by way of the second manifold a second stream of dilution gases, and maintaining the volume flow ratio and the velocity ratio between the two streams at the intake port at substantially constant non-zero values over a wide range of engine speed and load operating conditions, by
1. maintaining the plenum chambers of the two manifolds at the same load dependent pressure,
2. partially obstructing each branch of the first manifold when operating within said range of engine operating conditions in order to set the desired volume flow ratio between the two streams, the branches being obstructed by means of restrictions of predetermined flow cross sectional area, land positioning each restriction at a sufficient distance from its associated intake port to allow a high velocity jet induced at the restriction to diffuse over the cross sectional area of the first manifold branch before the stream reaches the intake port (14), thereby rendering the flow in the branch more uniform and reducing its velocity so as to set the desired velocity ratio between the two streams at the intake port when operating within said range of engine operating conditions.

* * * * *